United States Patent [19]

Callegari, Sr. et al.

[11] Patent Number: 4,753,633

[45] Date of Patent: Jun. 28, 1988

[54] SLURRY SEPARATOR

[75] Inventors: Stephen R. Callegari, Sr., 419 Orangewood Dr., Lafayette, La. 70503; Mitchell G. Labiche, Scott, La.

[73] Assignee: Stephen R. Callegari, Sr., Lafayette, La.

[21] Appl. No.: 935,948

[22] Filed: Nov. 28, 1986

[51] Int. Cl.$^4$ .............................................. B01D 17/038
[52] U.S. Cl. ...................... 494/58; 210/374; 210/375
[58] Field of Search ............ 494/57, 58, 59, 43, 494/55, 56; 210/374, 375, 304

[56] References Cited

U.S. PATENT DOCUMENTS

| 2,414,421 | 1/1947 | Small | 210/374 |
| 2,418,061 | 3/1947 | Weinberger | 210/23 H |
| 3,042,202 | 7/1962 | Work | 210/23 H |
| 3,533,506 | 10/1970 | Clark | 210/23 H |
| 4,097,357 | 6/1978 | Molitar | 210/23 H |
| 4,414,112 | 11/1983 | Simpson et al. | 210/23 H |
| 4,587,024 | 5/1986 | Hayatdavoudi | 210/739 |

Primary Examiner—Frank Sever
Attorney, Agent, or Firm—John D. Jeter

[57] ABSTRACT

A fluid stream solids separator provides a curved flow confining chamber to cause heavier constituents in a fluid stream, or slurry, flowing in the resulting curved path in the chamber to migrate radially outward with time and distance travelled. At least one skimmer blade is provided to protrude some distance into the stream from the radially outer flow boundary. The blade skims a strata of the heavier constituents from the stream and directs skimmed products into a separate exit flow path. A series of skimmer blades can be used to skim consecutive strata from the main stream. Fluid flow confining chambers of both mushroom and cylindrical shape are provided. Adjustment means, optionally provided, move the input guiding surfaces to change velocity and move the skimmer blades to change the thickness of strata extracted from the main stream.

14 Claims, 5 Drawing Sheets

SLURRY SEPARATOR

This invention pertains to the separation of heavier density materials from a fluid mixture, more particulialy the separation of higher density solids and non-miscable liquids from fluids, primarily for oilfield use, to clean up liquids emerging from oil wells. Apparatus serving such functions have become known as hydrocyclones, or cyclone separators. Apparatus of this invention, however, does not rely upon the induced cyclone action of fluid streams common to conventional separators.

RELATED ART

The U.S. Pat. No. 4,587,024, issued May 6, 1986, is probably the most recent development in fluid separators put into field service. The U.S. Pat. No. 2,754,968, issued July 17, 1956 is typical of the drilling mud processing systems which became common in oil field use during the 1960's using hydrocyclones. Other pertinent United States patents include U.S. Pat. No. 3,042,202 issued July 3, 1962; U.S. Pat. No. 3,533,506 issued Oct. 13, 1970; U.S. Pat. No. 4,097,375 issued June 27, 1978; and U.S. Pat. No. 4,414,112 issued Nov. 8, 1983.

Hydrocyclones now are purchasable items considered essential to oil field operations. Hydrocyclones are commonly applied to conventional drilling mud processing, and the processing of fluids emerging from well clean-up operations following perforation and other well completion activities.

BACKGROUND OF THE INVENTION

Fluids injected into wells in drilling operations have long been referred to as drilling muds. Drilling muds have additives to add density and other additives used to control viscosity and to condition drilled formations. Additionally, special muds are used in well completion activities to clean up and condition formations and well bores. The broad category of fluids containing additives and the fluids emerging from wells containing contaminants will hereinafter be referred to as slurries.

Fluid separators are commonly designed to recover additives for reuse and to separate contaminants for discarding. The separators, therefore, become classifiers of sorts and, ideally, remove unwanted materials and allow needed additives to remain in the recirculated slurry. When additives and contaminents both have to be removed from the slurry to extract the contaminents, it then becomes important to be able to separate the extracted total into useful material to be re-introduced into the slurry from useless materials to be discarded. These processes and materials involved are well known to those skilled in the art.

Conditions in well drilling continually change, and such changes alter the relationship between useful additives and useless contaminants. Hydrocyclones best serve the purpose if they have adjustable parameters to alter the nature of extracting proceses to stay optimum as the make-up of entering slurry changes.

Materials fluidly suspended in slurries exposed to a continuously curved flow path move radially in the flowing slurry body. In the absence of turbulence, the separable components of the slurry will move radially outward if heavier and radially inward if lighter. In time all heavier separable material would be at the radially outward dimension of the curved flow. Given a time limit in the curved flow path, the heaviest particles of a given size will be most radially outward. The finer particles of a given specific gravity, however, will not be as far radially outward, in limited time, as the coarser particles. In complex slurries, then, extracting particular materials becomes a complex matter, and hydrocyclones, or their equivalents, need an ability lending themselves to "fine tuning" by those skilled in the art of slurry processing.

In the presence of turbulence attending a curved flow, some finer materials may not move radially outward in the curved flow time available. It is advantageous, then, to reduce flow turbulence in the curved flow path. One of the greatest sources of disturbing turbulence in a curved flow path is the presence of fluid emerging from the curved flow stream in the area occupied by the incoming fluid stream. There is advantage in removing selected strata from the curved flow path before agitated fluids within the confining chamber are encountered.

It has been found that in a curved flow path, reasonably free of turbulence, stratification of materials entrained takes place rather rapidly. This makes possible simplification of the curved flow path confining structure.

It is therefore an object of this invention to provide apparatus to extract preferred strata from a curved path of flowing slurry before the curved flow is admitted to a receiving enclosure.

It is another object of this invention to provide apparatus to produce a curved flow path of slurry and to skin a strata of preselected thickness from the flow path for direction into a separate flow path.

It is yet another object of this invention to provide apparatus to adjust the thickness of the strata skimmed from a curved flow path of slurry.

It is still another object of this invention to provide an adjustable throttle area to control the velocity of slurry introduced into a curved flow path.

It is yet another object of this invention to provide flow rate controls to regulate the flow from extractor skimmer openings extracting preselected strata from a curved path of flowing slurry.

It is yet another object of this invention to provide a series of skimmer blades to extract a succession of strata from a curved stream of slurry, and to direct each skimmed strata into separate exit channels.

It is still a further object of this invention to provide apparatus to analyze effluent from a slurry separator and to utilize the information derived from the analyzer to control means to skim strata from a moving stream of slurry to regulate the thickness of strata skimmed from the stream.

It is yet a further object of this invention to provide apparatus to analyze effluent from a slurry separator and to utilize the output of the analyzer means to control the velocity of the stream of slurry entering a curved path of a slurry separator.

These and other objects, advantages, and features of this invention will be apparent to those skilled in the art from a consideration of this specification, including the attached drawings and appended claims.

SUMMARY OF THE INVENTION

A simplified slurry separator utilizes a curved flow path for slurry with skimmer blades to extract radially outward strata from the curved path of flowing slurry some distance from the inlet after the constituents of the slurry have classified according to relative specific gravity into strata due to relative centripetal force acting on the slurry constituents in the curved flow path. Alternate embodiments provide ajdustments for the thickness of strata skimmed for extraction from the main stream and provide for adjustment of the inlet area to control inlet velocity.

Optional features provide for real time analysis of the effluent streams and feedback from the analyzer to adjust internal parameters of the separator to control the related separator effluents.

Separator enclosures provide mushroom flow paths or cylindrical flow paths with skimmer blades extending into the resulting curved slurry streams to extract strata of preselected or adjustable thickness of skimmed strata.

With the exception of possible vortex flows incidental to the collection of effluents from the separator, conventional vortex flows common to hydrocyclones, for slurry separation, are not used.

DETAILED DESCRIPTION OF DRAWINGS

Figure 1:
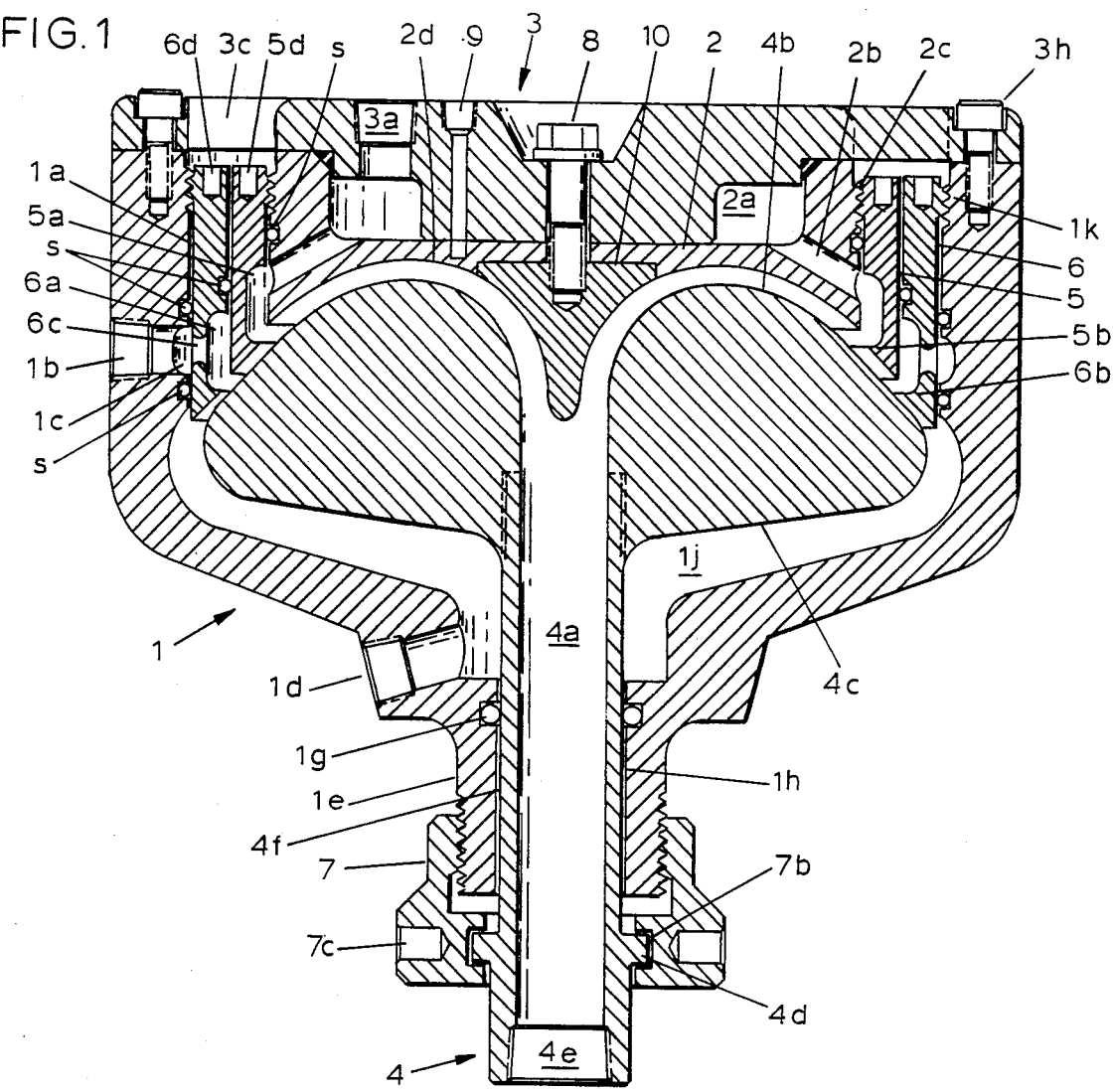
FIG. 1 is a side view, in cutaway, of the preferred embodiment of this invention.

FIG. 1 is the preferred embodiment of the present invention. Body 1 has mushroom shaped chamber 2d within which mushroom shaped plug 4 is supported. Slurry is injected through inlet 4e, the centerline of which is along the axis of symmetry of both mushroom shapes. Upward moving slurry in tube 4a is spread by replacable stem 10 and flows radially outward in a curved path between the two mushroom shapes, 2d and 4b. Skimmer blade 5 is a generally cylindrical shape and projects a knife edge 5b some distance into the slurry stream. The knife edge extends peripherally around the chamber. The resulting skimmed strata is collected in plenum 5a, exits through channel 2b, into plenum 2a and flows from the enclosure through collector ports 3a.

A second skimmer blade, 6 is also cylindrical and coaxial with blade 5, is situated in cylindrical bore 1a in the body, and extends a knife edge 6b some distance into the remaining slurry stream. Blade edge 6b skims off a preselected thickness of slurry strata into plenum 6a.

The skimmed flow proceeds through holes 6c into plenum 1c and flows from the enclosure through port 1b.

Blade 5 is adjustable vertically by threads 2c when the skimmer is rotated relative to the body. Skimmer 6 is adjusted vertically by threads 1k when blade 6 is rotated relative to the body. Access to the top of the skimmers is provided by opening 3c in the crown flange 3.

The residual slurry is returned around the outer perimeter of the plug 4. The separation between surface 4c and the the chamber enclosure provides channel 1j which directs flow to port 1d and out of the enclosure.

Plug 4 is shown as a single structure but it conveniently consists of two parts joined by threads. Tube 4f is axially adjustable in bore 1h by movement of adjusting nut 7. Nut 7 attaches to threads on body extension 1e. Flange 4d is capured in groove 7b. Holes 7c are for tool bars used to turn the nut. Seal 1g prevents fluid leakage from the chamber.

Various seals providing fluid tight integrity to skimmer and body interfaces, as well as insert 2, are captioned by s.

Crown insert 2 completes the mushroom chamber shape and provides a removable element for hard surfacing of the fluid swept surfaces. Stem 10 experiences considerable wear and is independently replacable, being retained by cap screw 8. Insert 2 is captured by screw 8 and positioned by mating cylindrical surfaces on crown flange 3.

A wear detector port 9 extends a fluid channel close to the surface 2d of the mushroom chamber. When surface 2d wears away to allow the slurry to apply fluid pressure to port 9, maintenance requirements are indicated.

To accomplish slurry stratification in the preferred 135 degree turn in the curved flow path, before skimming strata, control of turbulence is vital. Turbulence control is retained when in-flow area adjustments are made by moving all of plug 4 to influence the entire flow path preceding the first skimmer. After flow passes the last skimmer blade, turbulence that develops has no influence on separator performance.

It is well known that centripetal forces operating on a high density particle, entrained in a curved flow of lighter fluid, acts proportional to the square of the velocity of flow. The resistance to cross-flow movement of the particle, in a viscous fluid, is also well known to be approximately proportional to the square of the cross-flow velocity of the particle. With a fixed distance from the beginning of the curved flow to the point of extraction of the particle from the stream, the time available for cross-flow travel is inversely proportional to flow velocity. The ability of slurry to stratify then becomes more a matter of thinness of the curved stream and the absence of turbulence, then injection velocity.

To accomodate the rather rapid changes in the materials comprising a slurry, at least the skimmer blade adjustments need to be motorized and made responsive to a real time effluent analyzer. Once the parameters of the slurry separator are fine tuned to optimize the operation, motorizing the adjustment of the cylindrical skimmers as well as the adjusting nut 7 is a simple process to be described later.

Figure 2A:
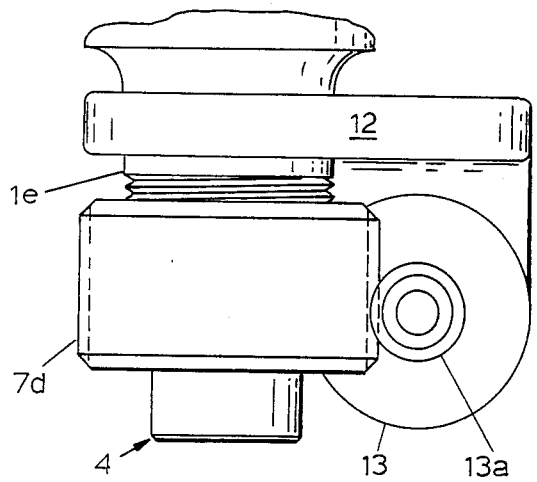
FIGS. 2A and 2B are complementary side views of a motorized drive for the apparatus of FIG. 1.
Figure 2B:
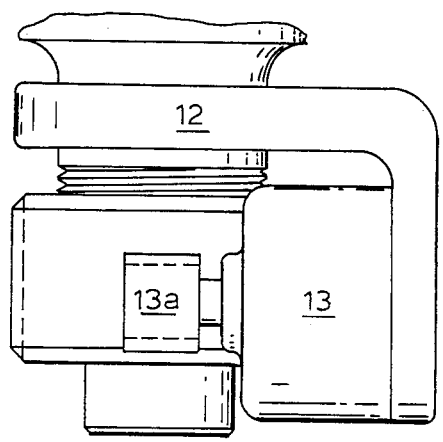

FIG. 2A represents apparatus to motorize adjusting nut 7 of FIG. 1. The view is from the side of the axis of extension 1e of FIG. 1. Bracket 12 clamps around extension 1e and is bolted to motor 13. Motor 13 drives worm gear 13a which engages helical gear teeth 7d on modified nut 7. Axial movement of nut 7 causes worm gear 13a to change axial position on the helical gear. FIG. 2B is a side view of FIG. 2A and shows the mounting bracket, motor and adjusting nut.

Figure 3A:
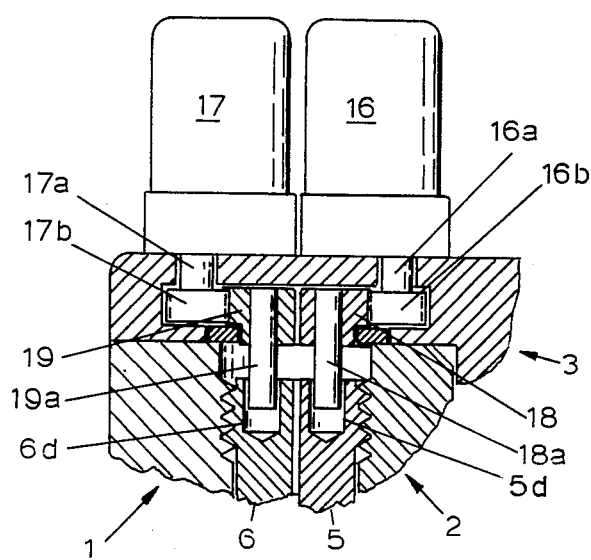
FIG. 3A is a broken away view, somewhat enlarged, of a selected area of FIG. 1 with adjustment drive motors in place.

FIG. 3A is a cutaway of a selected area of FIG. 1 showing mounting features of skimmer blade adjusting motors on crown flange 3. Motor 16 is mounted on crown flange 3 by cap screws (not shown). Drive shaft 16a supports and rotates spur gear 16b. Ring gear 18 is supported for rotation in a peripheral groove in crown flange 3 and has an axis of rotation coincident with that of skimmer 5. Drive tangs 18a engage holes 5d and rotate skimmer 5 and accomodate axial movement of the skimmer 5 as rotation occurs.

Motor 17 is mounted by cap screws (not shown) on the crown flange. Drive shaft 17a supports and rotates spur gear 17b. Spur gear 17b engages ring gear 19. Ring gear 19 is supported for rotation in a peripheral groove in the crown flange and has an axis of rotation coincident with that of skimmer 6. Drive tangs 19a engage holes 6d and accomodate axial movement of the skimmer as rotation occurs.

Motors 16 and 17 are shown mounted on the same radial line extending from the axis of symmetry of the chamber. This is a descriptive convenience and, as will be shown later, actual mounting of the motors involves different radial lines.

Figure 3C:
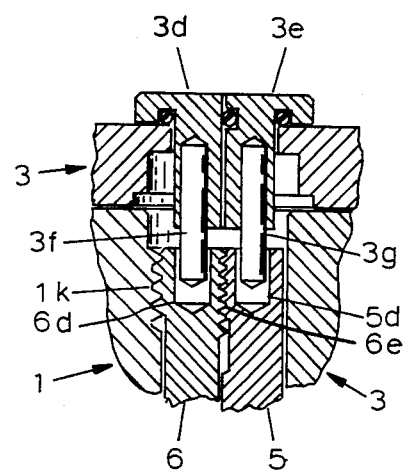
FIG. 3C is similar to FIG. 3A with no drive motors.
Figure 3B:
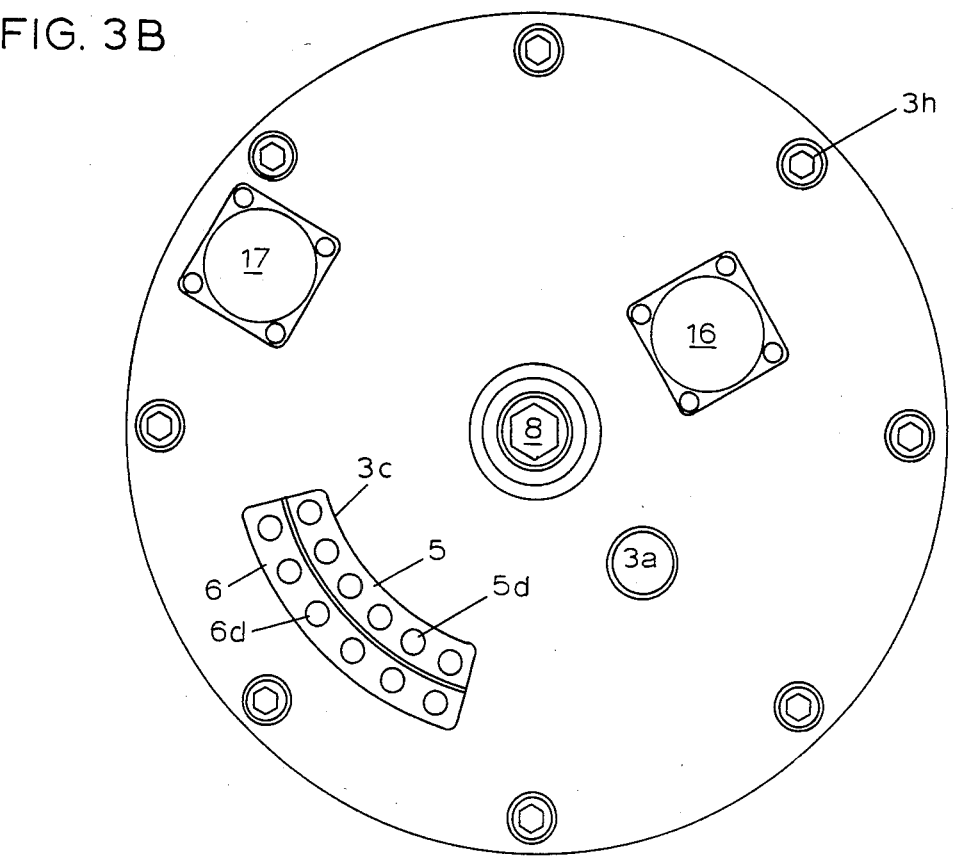
FIG. 3B is a top view of the apparatus of FIG. 1 with the drive motors of FIG. 3A in place.

FIG. 3B is a top view of the apparatus of FIG. 1. Motors 16 and 17 are shown in the proper relationship. Opening 3c reveals skimmers 5 and 6 which are tubular in this view. If motors are not being used to adjust the skimmers 5 and 6, holes 5d and 6d are engaged by manual dowel bars and can be turned some peripheral distance in opening 3c with each insertion of the dowel bar.

If the motors are in use to rotate the skimmers, ring gears 18 and 19 of FIG. 3A will cover the holes under opening 3c and the skimmers will not be visible.

Cap screws 3h secure crown flange 3 to body 1. For field service, a water tight cover (not shown) is placed over opening 3c.

In FIG. 3C, the skimmer adjustment threads are changed from those of FIG. 3A. Thread 2c is eliminated as is the mating thread on skimmer 5. Thread 6e is added to the inner wall of skimmer 6. Mating threads are added to the outside wall of the skimmer 5. By this arrangement, crown flange 3 can be removed with insert 2 attached without disturbing the skimmers.

By choice of thread pitch and helix direction of skimmer adjusting threads, skimmer 6 can be rotated while skimmer 5 is held stationary to adjust the thickness of strata skimmed by both skimmers and retain the ratio of the two strata thicknesses. The water tight covers 3d and 3e are shaped to fit opening 3c, collectively. Individually the covers can be removed to rotate the related skimmer below. Cover 3e is usually left on which causes pins 3g in holes 5d to lock skimmer 5 when the skimmer 6 is rotated. When cover 3d is in place, pins 3f, in holes 6d, lock skimmer 6. The covers and locks cannot be used when skimmer adjustment drive motors are in use but the thread arrangement of FIG. 3C may make it possible to use only motor 17 to satisfy the motor adjustment requirements in many cases. The cavity below opening 3c is usually filled with oil for the benefit of threads and gears.

Figure 4:
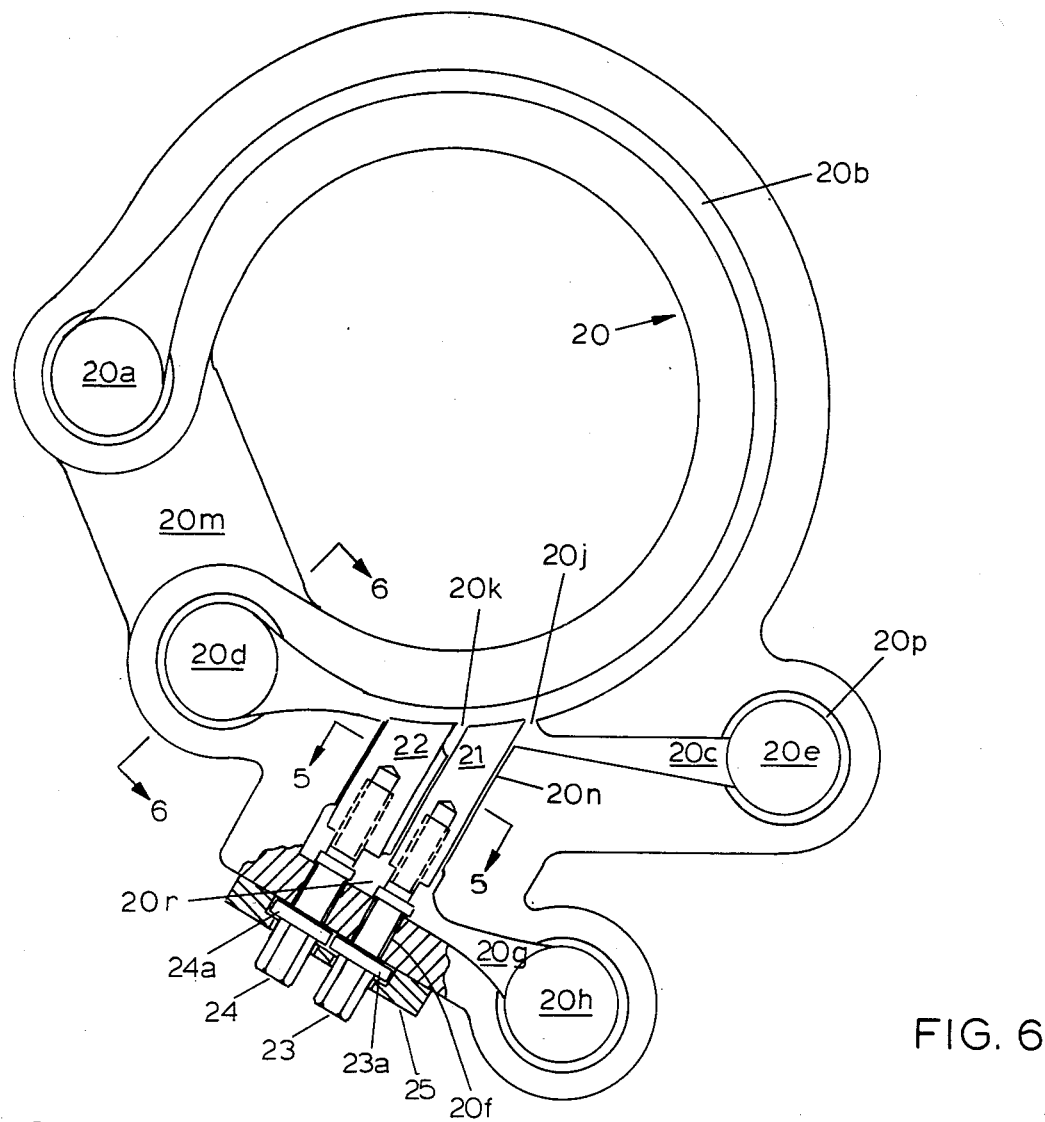
FIG. 4 is a plan view of an alternate embodiment of apparatus of this invention, with a selected area broken away.

FIG. 4 is a plan view of an alternate embodiment of the invention now called a curved chamber slurry classifier. To avoid confusion, this configuration will hereinafter be called a slurry separator. As shown, the cover plate is removed. The threaded cover screw holes are not shown because they are numerous and add nothing to the functional description. The cover is a flat plate about the shape of the body.

Cross bores 20a, 20d, 20e and 20h are drilled through the body and cover plate. Curved chamber 20b, channel 20c, slot 20n and channel 20g are milled from the view side, not through the far wall of the body. All such milled features, with the exception of slot 20n will eventually be used as cast. Holes 20f are drilled parallel the plane of the drawing. The cover does not have the throat opening containing the caption 20 but stiffener 20m is needed because the cover is often removed while the body is installed in a heavy system.

Slurry is introduced into crossbore 20a through a pipe adapter (not shown until later) and flows around curved chamber 20b. The chamber, in this case, is five times as deep as wide and slurry loses turbulence and stratifies. By the time slurry reaches skimmer blade 21, coarser and heavier particles are moving along the outer wall of the chamber. The coarser, heavier particles are usually contaminent and can be discarded through channel 20c and crossbore 20e. Blade 22 skims a strata radially farther inward and that strata may contain finer high density particles containing both useful additives and contaminent to be later discarded. Material skimmed by blade 22 flows between the blades, through flow area 20r, through channel 20g and out crossbore 20h. This effluent may need further processing. The residual slurry flows to and out crossbore 20d.

Skimmer blades 21 and 22 are a close fit in slot 20n and do not normally need resilient seals. Resilient seals can be placed between blades and slot surfaces if needed. Each blade slides longitudinally in the slot and relative to the other blade. Adjustment screws 23 and 24 threadedly engage blades 21 and 22 respectively and rotate freely in bores 20f. The thrust flanges 23a and 24a are part of the screws and have o-rings in grooves (not shown) between the flanges and the facing body surface to seal the leak path. Retainer 25 captures the flanges but allows rotation. The retainer is fastened by cap screws (not shown) to the body. The body is shown broken away to the screw centerlines. A hexagonal head terminates the screws and projects for turning the screws. A shallow circular relief 20p is on both sides of each crossbore to align attachments.

Figure 5:
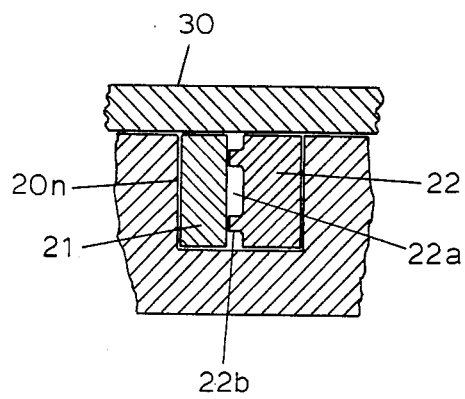
FIG. 5 is a sectional view taken along line 5—5 of FIG. 4.

FIG. 5 is taken along line 5—5 of FIG. 4 and shows the skimmer blades 21 and 22 in slot 20n. Cover 30 is a uniform flat plate sealed by compound and secured by cap screws (not shown) to the body. The sealing compound is kept away from the blades. This small view of the cover is adequately descriptive of the relationship between cover and body. Blade 22 is spaced from blade 21 by ridges 22b which do not extend to the knife edge. Fluid skimmed by blade 22 passes through channels 22a around the ridges.

Figure 6:
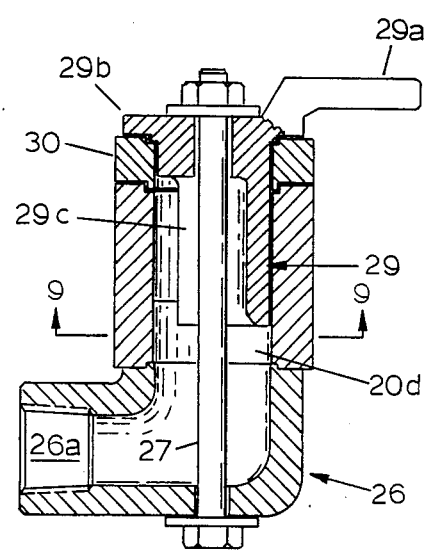
FIG. 6 is a selected area sectional view of the apparatus of FIG. 4 taken along line 6—6.

FIG. 6 is a cutaway through the crossbore 20d of FIG. 5. Adapter 26 can be clamped on either side of any crossbore by bolt 27. The adapter is pipe threaded at opening 26a. Throttle valve 29 is only preferred for crossbore 20d and 20h but will fit any crossbore. If the valve is not used, only a round washer (not shown) replaces the flange 29b to engage the bolt 27 and close that side of the crossbore. Valve 29 has restrictor opening 29c. Rotation of the valve pinches flow against the chamber wall to throttle. This will be more clearly shown later, but the valve otherwise fits the crossbore closely for rotation therein. Valve handle 29a will rotate the valve if bolt 27 is slightly loosened. Throttling of crossbores handling effluent is often necessary to prevent disturbance of the flow streamlines at the skimmer blades.

Motorizing the effluent throttle valves is more convenient if handle 29a is replaced by a valve operator plate as will be shown later. Throttle valves can be placed downstream of any effluent crossbore adapter, in which case the valve 29 is not needed.

Figure 7:
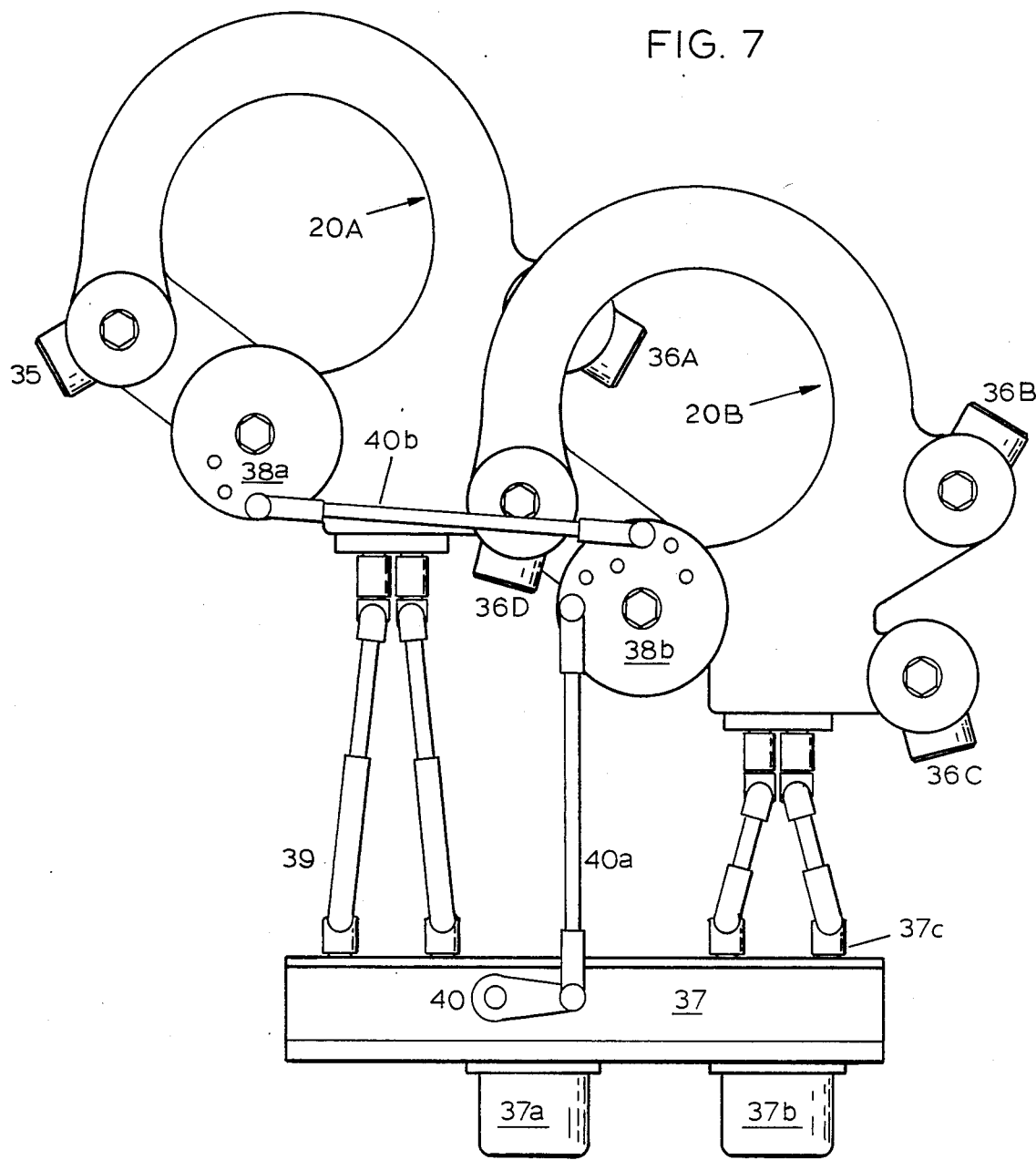
FIG. 7 is a plan view of a cascade assembly of the apparatus of FIG. 4, with adjustment drive motors.

FIG. 7 shows two separators 20A and 20B connected directly at the crossbores to produce a cascade of separators. Any number of separators can be connected in like manner to any crossbore. Two separators will usually suffice to minimize discarded additive lost with discarded contaminant. In FIG. 7 each separator is a full assembly. The residual slurry outlets of both separators are fitted with a throttle valve, shown only as operator plates 38a and 38b. All crossbores are fitted with adapters 26 of FIG. 6 on the far side.

Slurry is supplied through inlet 35 into separator 20A. The first skimmed strata is discharged through outlet 36A. The second skimmed strata is injected directly into the entry crossbore of separator 20B. The directly connected crossbores are shown in a side view later. Residual effluent from separator 20A has a valve controlled discharge below plate 38a through an adapter (type 26, not shown).

The second skimmed strata is further processed in separator 20B. From separator 20B, the first skimmed strata is discharged at outlet 36B. The second skimmed strata is discharged through outlet 36C. The residual slurry is valved out a type 26 outlet adapter (not shown) below operator plate 38b. Outlet 36D is a laboratory utility outlet for occasional sampling of slurry at the inlet to separator 20B, and is commonly closed off by a separate valve (not shown).

There are 5 service outlets for the assembly shown. The nature of the feedstock slurry and the subsequent us of cleaned slurry will determine which of the outlets can be recombined for reuse. The first skimmed strata from each separator, outlets 36A and 36B can usually be directly discarded.

Laboratory gearbox 37 has output shafts 37c. The ratio of turns of the shafts can be conveniently altered by quick change gears (not shown) inside the box. Motor 37b drives all 37c output shafts.

Coupling shafts 39 are mechanic-type socket drives with two universal joints each. The one modification provides one spring loaded telescoping midsection for each coupling shaft. To correlate an adjustment with other adjustments, the socket is pulled back from the hexagonal ends on the adjusting screws, one increment of hexagonal turn is made and the socket is allowed to push back in place.

Motor 37a drives ball crank 40 through reduction gears (not shown) and moves drag link 40a to rotate valve operator plate 38b. Drag link 40b connects plate 38b and 38a. The drag links are adjustable in length by screw threads in the ball joint connections on each link end.

The gearbox and adjustment drives shown are not points of novelty, as such, are well established in the art and, hence, are not described in detail. The apparatus of FIG. 7 illustrates that the separators, individually, or in cascade, are subject to motor controlled adjustments. The ideal motorized control will have little backlash in the motion transmission system and should be incorporated into the general frame or body of the overall system. Direct acting cams offer logical advantage in driving blade adjustments through sealed pushrods. Such control options are anticipated by and are within the scope of the claims.

The primary reason for motorizing adjustments is to provide real time response to real time effluent analyzers. Equipment in the art can readily motorize all adjustments independently in response to an analyzer output. Running a plurality of adjustments from the same drive system appears possible and is more economical.

Figure 8:
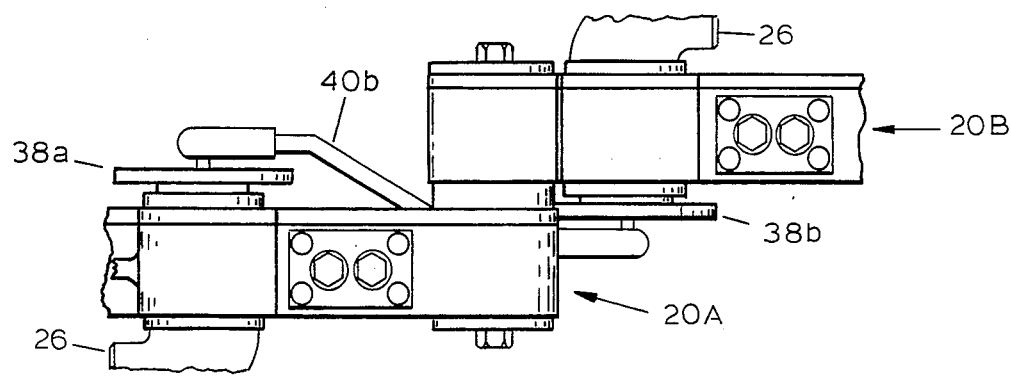
FIG. 8 is a side view of the apparatus of FIG. 7, showing interconnect features.

FIG. 8 is a view from the gearbox side of the cascade assembly with the gearbox and connecting links 39 and 40a removed. The direct connection of the residual crossbore of separator 20A and the entry crossbore of separator 20B is illustrated. This view differs from FIG. 7 by placement of the valve operator plate 38b below the separator 20B. This is an option on any crossbore valve.

The valve operator plates have a variety of holes for connecting link ball joint studs. By choice of holes used, the ratio of rotation of the synchronized valves can be selected. The relative position of the valves, in terms of throttling effect at any starting point, is determined by connecting length adjustment.

Figure 9:
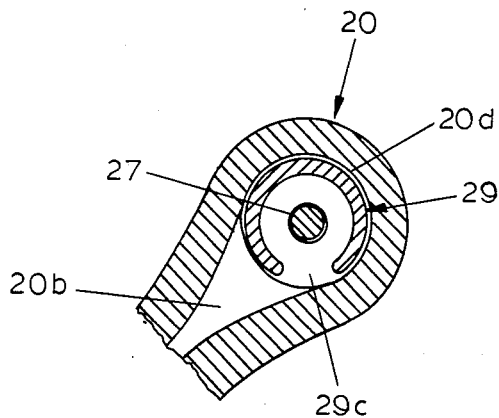
FIG. 9 is a sectional view taken along line 9—9 of FIG. 6.

FIG. 9 is a sectional view of the apparatus of FIG. 6 taken along line 9—9. Valve 29 is situated in bore 20d in body 20. Restrictor opening 29c cooperates with body surfaces to function as a rotary valve, to control fluid flow through channel 20b.

Figure 10:
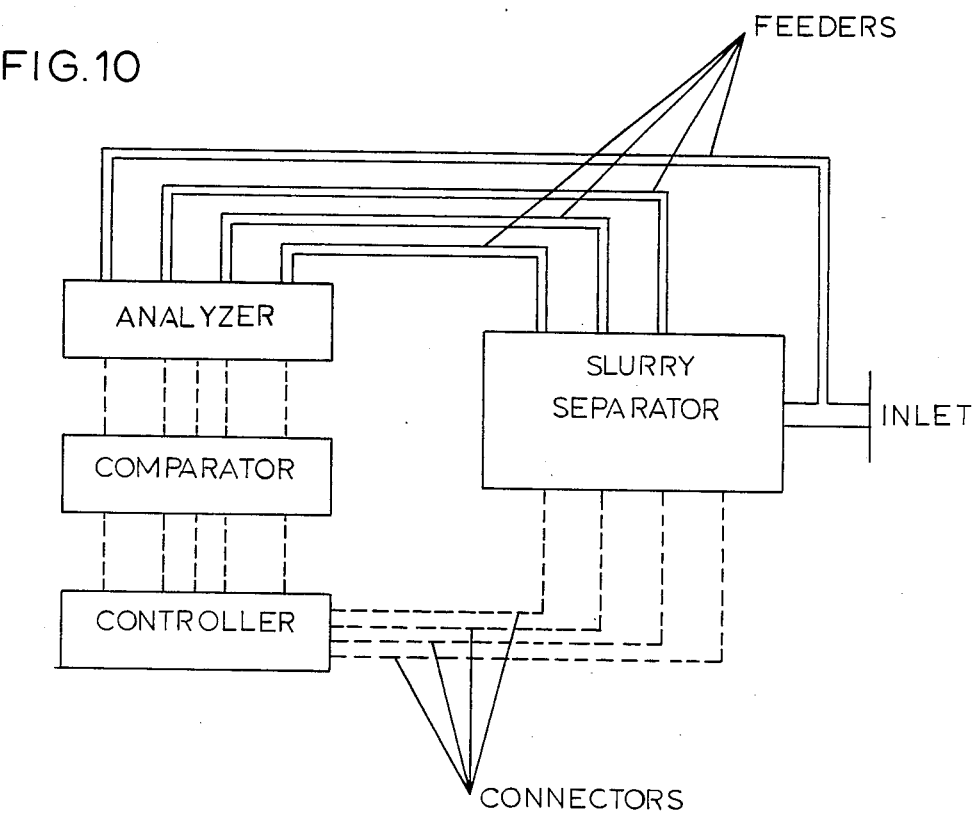
FIG. 10 is a schematic representation of an instrumentation and control system to be used with the slurry separator.

FIG. 10 is a schematic for an analyzer, comparator and controller loop usable with the slurry separator. Feeder lines supply small flow rates of representative slurry from the various separator outlets. The inlet slurry may also be sampled to permit control adjustments before slurry is passed through the separator. The analyzer is not detailed because a variety of such equipment is in the art and is not a point of novelty. Particle size analyzers ideally read out the distribution of particle size. As shown, a multi-channel analyzer is best and the various channels can be scanned and the results displayed in conventional fashion.

A comparator permits the input from the analyzer to be compared with preselected standards selected for the particular job to provide variance output signals for the use of the controller.

The controller responds to variance signals and adjusts the parameters already described on the separator. The controller to separator connectors have been described. The long term stability of the mechanical drives are preferred over the hydraulic equivalent.

It is recognized that the skimmer knives may, in time, be compromised by fibrous material hanging on the knife edges. Periodic back-streaming through the separator is planned to clear material from the knives. Clean material will be backstreamed to feedstock lines. This is a plumbing and valving matter of choice but is to be automatic with adjustable time sequencing.

It should be noted that the terms strata and layer are interchangably used with reference to part of the slurry stream.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, we claim:

1. Apparatus for separating a stream of slurry into components according to relative density, the apparatus comprising:
   (a) a housing, having an inlet and an internal chamber;
   (b) stream control means in said housing arranged to provide a thin stream of slurry, reasonably free of turbulence, and to provide acceleration forces across said stream of slurry in the direction of the thin dimension, said stream control means comprising; surfaces of said internal chamber arranged to direct said stream of slurry from said inlet into a thin stream and to curve said stream of slurry such that the radius of curvature is generally parallel said thin dimension;
   (c) a strata extractor channel opening into said internal chamber, arranged to extract a selected strata of slurry from said stream of slurry, said strata being part of said thin dimension;
   (d) an extractor conduit arranged to conduct slurry from said strata extractor channel from said housing to a first receiver means;
   (e) a discharge channel arranged to conduct the balance of said slurry stream, remaining after strata extraction, from said housing to a second receiver means.

2. The apparatus of claim 1 wherein said strata extractor channel comprises a plurality of independent channels, each provided with an independent conduit to conduct extracted slurry from said housing to receiving means.

3. The apparatus of claim 1 wherein said strata extractor channel has knife edges to separate said selected strata of slurry from said stream of slurry.

4. The apparatus of claim 1 wherein said internal chamber has a generally toroidal shape, at least in part, with the toroidal axis of symmetry generally coincident with the a vector representing the inflow of said stream of slurry into said internal chamber.

5. The apparatus of claim 4 wherein said strata extractor channel has a skimmer knife edge that extends some distance in the direction of said thin dimension from the surface of said internal chamber.

6. The apparatus of claim 5 wherein adjustment means is provided to adjust and control the distance of said knife edge from said surface to control the thickness of strata skimmed from said thin dimension.

7. The apparatus of claim 4 wherein said thin stream of slurry is confined to the surface of said internal chamber by a generally toroidal shaped plug that is mounted on said housing and is movable relative to said surface of said internal chamber such that said thin dimension is adjustable.

8. The apparatus of claim 1 wherein throttle means is provided to restrict the flow of slurry from said extractor conduit.

9. The apparatus of claim 1 wherein throttle means is provided to restrict the flow of slurry from said discharge channel.

10. The apparatus of claim 1 wherein said internal chamber is of a cylindrical shape the radius of which is generally coincident with said radius of curvature of said stream of slurry.

11. The apparatus of claim 10 wherein said thin stream of slurry is divided into a more radially outward stream in communication with said extractor conduit and a more radially inward stream in communication with said discharge channel, said stream division executed after said stream of slurry has moved some distance along the curved path.

12. The apparatus of claim 11 wherein said stream of slurry is divided by a knife edge extending parallel the axis of said cylindrical surface.

13. The apparatus of claim 12 wherein said knife edge is movable to adjust the relative thicknesses of the divided streams of slurry.

14. Apparatus for separating a stream of slurry into components according to relative density, the apparatus comprising:
   (a) a housing, having an inlet and an internal chamber;
   (b) stream control means in said housing arranged to provide a thin stream of slurry, reasonably free of turbulence, and to provide acceleration forces across said stream of slurry in the direction of the thin dimension, said stream control means comprising; surfaces of said internal chamber arranged to direct said stream of slurry from said inlet into a thin stream and to curve said stream of slurry such that the radius of curvature is generally parallel said thin dimension;
   (c) divider means arranged to separate said stream of slurry along a line generally perpendicular to both said thin dimension and to the direction of flow of said stream of slurry, to produce a plurality of continuing slurry streams; and
   (d) discharge means in said housing arranged to conduct at least two of said continuing slurry streams from said housing to slurry component receiving means.

* * * * *